United States Patent [19]

Klein

[11] 4,454,044
[45] Jun. 12, 1984

[54] WATER TREATMENT PROCESS

[76] Inventor: Max Klein, P.O. Box 3, Dalton, Mass. 01226

[21] Appl. No.: 282,943

[22] Filed: Jul. 13, 1981

[51] Int. Cl.³ .............................. C02F 1/28; C02F 1/42
[52] U.S. Cl. .................................... 210/663; 210/679; 210/778; 210/913
[58] Field of Search .............. 210/679, 685, 694, 777, 210/778, 193, 323.1, 335, 502–509, 913, 663, 669; 162/146, 164.1, 164.6, 164.7, 168 R, 168 N, 169, 181.5, 181.6, 181.8, 181.9

[56] References Cited

U.S. PATENT DOCUMENTS

| | | | |
|---|---|---|---|
| 1,928,398 | 9/1933 | Urbain | 210/667 |
| 3,077,449 | 2/1963 | Kirk | 210/777 |
| 3,227,650 | 1/1966 | Bell | 210/727 |
| 3,246,767 | 4/1966 | Pall et al. | 55/521 |
| 3,252,899 | 5/1966 | Rice et al. | 210/666 |
| 3,327,859 | 6/1967 | Pall | 210/502 |
| 3,399,136 | 8/1968 | Bell | 210/726 |
| 3,420,709 | 1/1969 | Barrett et al. | 210/502 |
| 3,494,826 | 2/1970 | Scheiber | 162/164.6 |
| 3,562,154 | 2/1965 | Davis et al. | 210/730 |
| 3,658,184 | 4/1972 | Davis et al. | 210/504 |
| 4,028,233 | 6/1977 | Quentin et al. | 210/666 |
| 4,200,679 | 4/1980 | Klein | 521/918 |
| 4,207,378 | 6/1980 | Klein | 428/407 |
| 4,239,516 | 12/1980 | Klein | 210/502 |
| 4,286,977 | 9/1981 | Klein | 428/402 |
| 4,293,378 | 10/1981 | Klein | 162/146 |
| 4,304,873 | 12/1981 | Klein | 428/402 |

OTHER PUBLICATIONS

Manual of Treatment Techniques for Meeting the Interim Primary Drinking Water Regulations, U.S. Environmental Protection Agency, Office of Research and Development, Cincinnati, Ohio May 1977, Revised Apr. 1978 pp. 37–42.

Drinking Water and Health, National Academy of Science, Washington, D.C., 1977 pp. 183–189.

*Primary Examiner*—Peter A. Hruskoci
*Attorney, Agent, or Firm*—Dann, Dorfman, Herrell & Skillman

[57] ABSTRACT

A water treatment process for removing turbidity-causing impurities from water which involves contacting water containing such impurities with a relatively small amount of filter aid material, e.g., diatomaceous earth, for a time sufficient for impurities in the water to become adsorbed on said filter aid material, passing the water containing the filter aid material with impurities adsorbed thereon through a pre-filter having a flow rate of two liters/min./sq. m., or greater, and thereafter through a filter medium in the form of a porous, nonwoven matrix consisting essentially of randomly arranged, irregularly intersecting and overlapping cellulose fibers intermixed with micro-bits of an expanded thermoplastic styrene-polymer or lower polyolefin, or of a flexible foamed polyurethane. The filter medium also includes one or more additional materials from the group of a fibrous wet web strengthening agent, a wet web support releasing agent a wet-strength enhancing agent and an adsorption agent selected from finely divided activated carbon, diatomaceous earth, colloidal alumina monohydrate and ion exchange resin. A system for carrying out the water treatment process is also disclosed.

16 Claims, 3 Drawing Figures

WATER TREATMENT PROCESS

BACKGROUND OF THE INVENTION

The present invention relates to an improved process for removing turbidity-causing impurities from surface waters and other domestic and industrial water supplies containing such impurities.

Turbid water has a haziness caused by insoluble, suspended particles such as clay, silt, bacteria, viruses, organic debris resulting from the decay of plant life and similar materials present in the water. Turbidity standards have been established by governmental regulatory authorities for determining the water quality of municipal distribution facilities. With certain limited exceptions, a monthly average of one turbidity unit (TU) has been set as the maximum contaminant limit for turbidity. Turbidity measurements are made by determining the amount of light that is scattered by particulate matter in a sample of water.

Although water treatment for turbidity removal may vary depending on raw water quality, conventional systems generally involve pre-treatment including coagulation/flocculation and sedimentation, followed by filtration and chlorination.

Coagulation is ordinarily carried out in a rapid mixing tank by adding to the raw water a chemical agent which causes agglomeration of the suspended matter into larger particles that can settle to the bottom of a containment means. The agglomerated particles, or floc, are sometimes subjected to gentle agitation in order to form floc bundles large enough to settle rapidly. A separate flocculation tank is often provided for this purpose.

Sedimentation is the process by which floc is separated from water by precipitation and deposition, and depends on the effect of gravity on particles suspended in a liquid of lesser density. Sedimentation without pre-treatment is rarely adequate for clarification of turbid water, as it does very little for removal of such fine particulate substances as clay, bacteria and the like. Also, sedimentation results in sludge formation and thus requires means for disposal of the sludge.

After the impure water undergoes appropriate pre-treatment, it is filtered for the removal of suspended particles by passage through a porous medium. Most conventional water treatment systems employ granular media filtration. For example, rapid sand filters and mixed media filters (e.g. sand and particulate coal) have proved effective for reducing turbidity. However, granular media filtration virtually always requires chemical pre-treatment for effective turbidity removal. Slow sand filters, which were among the first water treatment systems to be used for large scale filtration, have numerous shortcomings when it comes to treating turbid water, including low filtration capacity, channeling, and ease of clogging.

The cost of the space and equipment required for installation of a conventional water treatment system of the type described above is considerable, as is the continuing cost of operation and maintenance of such a system. Although efforts toward improving these prior art processes have continued, the improvements have related in general to enhancing floc formation and sedimentation, reducing the load on the filters, and using larger grained sand and higher filtration rates as a means of reducing cost.

Alternative municipal water treatment processes employing filter-aid principles have been developed more recently to reduce the requirements for large and expensive vessels to provide for floc formation and sedimentation. These systems are commonly known as pre-coat filtration systems and consist essentially of a pressure vessel containing a porous septum which is coated on the upstream side with a powdered filter medium which forms the precoat filter cake. As water flows through the cake, the solid impurities present in the water are caught in the cake's small pores. In this system, additional filter aid is normally added to the body of the raw water in an amount sufficient for efficient and effective turbidity removal, the added filter aid being referred to as a body feed. The amount of body feed must be such as to prevent filter binding and waste of precoat material resulting from short periods of operation. In general, optimum results are obtained using about 0.8% to 1.0% of body feed by weight, in accordance with the manufacturers' recommendations. The most widely used of the precoat filters is the diatomaceous earth filter.

It has been reported that effective clarification and purification of turbid water may be achieved by precoat filtration, using relatively small amounts of diatomaceous earth as body feed, provided that chemical additives, namely floculating agents and polyelectrolytes, are added to the raw water with the body feed. See, U.S. Pat. No. 3,227,650. Apparently, the use of polyelectrolytes in this patented process is essential, for if a flocculating agent alone is used in conjunction with the diatomaceous earth, the water is practically unfilterable. Further, it has been found that if diatomaceous earth alone is used as the precoat and body feed, the filtrate, while reduced in turbidity, is unacceptable for potable or industrial use.

While recent developments in the art have eliminated some of the cost of installation and equipment maintenance, the overall operating cost of municipal water treatment remains relatively high. In short, the cost of water treatment, whether by conventional systems or by systems operating on the filter aid principle, makes it uneconomic for many smaller sized municipalities and industries which might advantageously employ a water treatment plant. Hence, the development of an efficient and effective process for producing substantially pure, clear water for domestic and industrial consumption at a reasonable cost continues to be a highly desired objective.

SUMMARY OF THE INVENTION

It has now been found in accordance with the present invention that by appropriate selection of the filter medium, water treatment based on filter aid principles can consistently reduce turbidity to acceptable levels using a relatively small amount of filter aid material as a body feed. A significant aspect of the present process invention is that it achieves turbidity removal without the need for chemical pre-treatment or additives, such as flocculating agents or polyelectrolytes. In addition, the process may be practiced without backwashing of the filter medium, as is usually required in precoat filtration systems. The present invention is capable of producing potable water for domestic use or clear, relatively pure recycle water for industrial use.

In one aspect of the invention, turbidity causing impurities are removed from water by adding to the impure water a relatively minor amount of a filter aid material, contacting the impure water with the filter aid material for a time sufficient for the impurities in the water to become adsorbed on the filter aid material, and passing the impure water containing the filter aid material with impurities adsorbed thereon, first, through a pre-filter having a flow rate of two liters/min./sq. m., or greater, at a nominal ΔP, i.e., on the order of about 0.5 kg./sq. cm., and then through a filter medium in the form of a porous, non-woven matrix consisting essentially of randomly arranged, irregularly intersecting and overlapping cellulose fibers and polymer micro-bits produced from any expanded thermoplastic styrene-polymer, or lower polyolefin, or polyolefin composition, or a flexible foamed polyurethane, all of which being non-brittle in expanded form. A detailed description of the polymer micro-bits and their method of preparation will be provided hereinbelow. One or more additional materials, including a wet web strengthening agent, a wet web support releasing agent, a wet strength enhancing agent and an adsorbing agent selected from the group of finely divided activated carbon, diatomaceous earth, colloidal alumina monohydrate and ion exchange resin, may also be incorporated in the filter medium along with the cellulose fibers and polymer micro-bits.

According to another aspect of the invention there is provided a system for carrying out the present process. This system includes a source of raw water, a filter device containing the aforesaid filtration medium for removing turbidity-causing impurities from the water, and a conduit for carrying the impure water from the source to the filter device. The conduit has an inlet for introduction of filter aid material into the impure water passing through it and means for delivering filter aid material to the conduit inlet. The system also includes means for mixing the filter aid material with the raw water. The source of raw water is disposed above the filter device so that the flow of water through the conduit is by gravitational force, and the filter aid delivery means and mixing means are so arranged as not to diminish appreciably the effect of gravitational force on the flow of water.

The present invention provides a practical means for overcoming the deficiencies of the prior art water treatment processes noted above, and enables the production of relatively high quality water at a reasonable cost.

Other aspects and advantages of the present invention will be apparent to those skilled in the art upon reading the following detailed description thereof.

DETAILED DESCRIPTION OF THE PREFERRED EMBODIMENTS

Any of the well known filter aid materials may be used in practicing the present invention. These include diatomaceous earth, perlite, fuller's earth, vermiculite, volcanic ash, fly ash and the like. Mixtures of these materials may also be used. The preferred filter aid material is diatomaceous earth. The choice of a particular grade of filter aid material will depend on the raw water quality, filter design and similar factors, and may be readily determined by test procedures well known to those skilled in the art.

In the initial step of the process of the present invention, a relatively minor amount of the filter aid material is added as a body feed to the water undergoing treatment. In general, the amount of filter aid body feed should be about four times the amount of turbidity-causing impurities present in the water. For example, if the level of impurities is 5 ppm, the amount of filter aid used should be 20 ppm, or 0.002 weight percent. Ordinarily, 0.1 weight percent of filter aid should be more than adequate in municipal water systems, since the level of contaminants in the raw water is typically 15 ppm or less. Satisfactory turbidity reduction has been obtained using filter aid in an amount of 0.003 weight percent. Although this amount may seem quite small, a small amount of filter aid is all that is necessary for substantially improved through-put in the operation of the process. The filter aid body feed is necessary to prevent the filter medium from blinding after a relatively short period of operation.

The impure water and the added filter aid material should remain in contact for a time sufficient for the impurities in the water to become adsorbed on the filter aid material. The appropriate contact time may be determined on a case-by-case basis taking into account such factors as raw water quality, quality fluctuation and desired flow rate. As will appear from the experimental results reported hereinbelow, substantial turbidity reduction may be obtained using a contact time of approximately 20 minutes.

The impure water containing the filter aid material with impurities adsorbed thereon is passed through a pre-filter having a flow rate of two liters/min./sq.m., or greater, at a nominal ΔP, i.e., on the order of about 0.5 kg/sq. cm., and then through a filter medium of the type described above.

Both the pre-filter and filter medium are conveniently prepared by a wet-lay process using conventional paper-making technology. Details of the preparation of these two materials are set forth hereinbelow.

A preferred pre-filter material for use in the present invention is described in my co-pending application Ser. No. 110,844, filed Jan. 10, 1980, now U.S. Pat. No. 4,293,378, entitled "Enhanced Wet Strength Filter Mat to Separate Particulates from Fluids and/or Coalesce Entrained Droplets from Gases", the entire disclosure of which is incorporated in the present application by reference, as if actually set forth herein in full. This pre-filter material is a non-woven matrix formed from randomly arranged, irregularly intersecting and overlapping glass fibers intermixed with the polymer micro-bits referred to above, and further includes an intimate blend or cobeat of cellulose fibers and the same polymer micro-bits, polyester fibers and a mixture of organic binders.

More specifically, the pre-filter has the following composition in which the precentages are based on the total weight of the finished pre-filter;
  (a) from about 64.1% to about 83.5% of (i) glass fibers that are about one inch long and of about 12 microns in diameter, or (ii) glass fibers that are about three-eighths inch long and about 6 microns in diameter, or mixtures thereof (preferably 50—50 mixtures);
  (b) from about 5.5% to about 12.8% of polymer micro-bits (the chemical composition of which will be set forth below in describing the filter medium);
  (c) from about 2.8% to about 8.1% of polyvinyl alcohol, as a binder for the matrix;
  (d) from about 6.6 to about 9.5% of an intimate blend of (i') one part of polymer micro-bits intermixed with (ii') from about one to about two parts of cellulose fibers, and (iii) non-shrinkable, non-slip polyester fibers in an amount from zero to about 7% of the sum of said (i') and (ii"); and (e) from about 3.3% to about 5.5% of a melamine-formaldehyde resin as a wet strength enhancing binder.

This particular material has excellent tensile strength and high porosity for good flow rates, yet is sufficiently dense to remove extremely finely divided solid particles from an aqueous stream. The flow rate of the pre-filter may be as high as 200 liters/min./sq. m. at a ΔP of about 3.5 kg./sq. cm. Additional information regarding this preferred pre-filter material and its method of preparation may be obtained by reference to my aforesaid copending application.

It should be noted that, instead of the matrix just described, a pre-coat of conventional filter aid material may be used as the pre-filter. However, the above-described matrix is preferred.

The filter medium employed in the present invention includes as its principle constituents, cellulose fibers and polymer micro-bits. The primary function of the cellulose fibers is to impart sufficient structural integrity to the filter medium matrix to enable it to withstand the stresses it will be subjected to during use. The polymer micro-bits serve principally to enhance the porosity of the filter medium and ensure the desired filtrate flow rate. The micro-bits also aid in retaining the particulate adsorbing agents in the filter medium.

In order to optimize the integrity and porosity of the filter medium, it has been found that the cellulose fibers and polymer micro-bits should be intimately blended into what is referred to herein as a cobeat, which preferably is composed of about one part micro-bits and from about one to about two parts cellulose fibers. The cobeat is so named because, after forming a uniform dispersion of the cellulose fibers and polymer micro-bits in a paper-making pulper, for example, the dispersion is fed into a beater and subjected to beating action until the freeness is within the range of about 400 to about 450. Freeness is generally understood by those skilled in the art to be a measure of the rate of flow of water through a pulp and is determined in accordance with Tappi Standard T227 m-58 (also referred to as the Canadian Standard Freeness). In the beater, the cellulose fibers become swollen, cut, frayed and fibrillated (the action of the micro-bits on the cellulose fibers apparently contributing to their transformation), the result being an interlocking of the micro-bit particles or parts thereof with the fibrillar structure of the cellulose. The micro-bits enhance the dispersion of the cellulose fibers during formation of the cobeat and serve to keep the cellulose fibers free of clumps and clusters. If the individual ingredients of the cobeat are used as such in preparing the filter medium, i.e., without intimate blending, optimum matrix integrity and porosity will not be achieved.

The cobeat dispersion may be converted to web or sheet form using conventional paper-making processes and apparatus. After adequate drying, the cobeat web or sheet becomes a storable product which is available for use when needed.

The cellulose fibers of the cobeat are of the type ordinarily used in paper-making and are preferably of writing paper grade, such as cotton fibers from cotton rags or linters. These cellulose fibers are conveniently prepared in the form of a wet lap composed principally of fiber cuttings and cotton linters which are washed (bleached if necessary), separated, e.g. by a hollander, into fibers of from about 4 mm. to about 1 cm. in length, and fed to a wet lap-making machine for formation of a web, which is then compressed between pressure rolls to a thickness of about 2 mm. and a water content of about 80 weight percent.

The micro-bits used in preparing the filter medium are the same as those used in the pre-filter and are produced from an expanded thermoplastic polymer selected from the group of (a) a styrene-polymer, (b) a lower polyolefin, which is the polymer of an ethylenically unsaturated hydrocarbon monomer having from two to six carbon atoms, (c) a melt alloy of polyethylene with up to about 10% by weight of polystyrene, (d) a copolymer of propylene with from about 20% to about 30% by weight of ethylene, (e) a melt alloy composed of at least 50% by weight of polypropylene and the balance being a copolymer of ethylene with up to about 30% of said copolymer being vinyl acetate, and (f) a flexible foamed polyurethane, each of said polymers being non-brittle in the expanded form used to produce the micro-bits.

Micro-bits of an expanded, thermoplastic styrene-polymer or lower polyolefin are more fully described, along with their process of preparation, in my U.S. Pat. No. 4,207,378, issued Apr. 29, 1980, the entire disclosure of which is incorporated in the present application by reference, as if actually set forth herein in full. The lower polyolefin may be formed from any ethylenically unsaturated hydrocarbon monomer having from 2 to 6 carbon atoms. These micro-bits may be broadly described as being (a) from about 40 to about 325 microns long and from about 20 to about 320 microns wide, (b) substantially to entirely free of intact cells of the expanded polymer bit pieces from which they were produced, (c) substantially non-uniform in outline of the individual micro-bit particles, and (d) in density, about 85 percent or more of the density of the specific unexpanded polymer from which the aforesaid expanded polymers are produced.

The expression "bit pieces" refers to the form of the starting material used in the preparation of the micro-bits, as described in my aforementioned U.S. Pat. No. 4,207,378, which also sets forth in rather broad terms the intended scope of the expression "styrene-polymer".

The foamed polyurethane micro-bits are produced from flexible polyurethane foams, the preparation and properties of which are described, for example, in the "Handbook of Foamed Plastics", Bender, Rene J., Section X, pp. 173–236, Lake Publishing Corporation, Libertyville, Ill., U.S.A. (1955); "Polyurethanes: Chemistry and Technology", Saunders & Frisch, Chapter VII, Part II, Interscience Publishers, New York, N.Y., U.S.A. (1964); and "The Development and Use of Polyurethane Foams", Doyle, E. N., pp. 233–256, McGraw Hill Book Company, New York, N.Y., U.S.A. (1971).

The flexible polyurethane foams used to provided foam polyurethane micro-bits preferably should be no more than about 96 gm./liter in density, preferably ranging from about 48 gm./liter to about 16 gm./liter. These generally show excellent recovery after 75% deflection with approximately less than 1% loss in height (as determined by American Society of Testing Materials D-1564-64T). The starting material for the polyurethane micro-bits, albeit a flexible, foamed material, is not initially in the form of bit pieces, as in the preparation of styrene-polymer and lower polyolefin micro-bits, but rather in the form of continuous foamed blocks, which must be shredded into bit pieces.

The foamed polyurethane micro-bits and their preparation are more fully described in my U.S. Pat. No. 4,200,679, the entire disclosure of which is incorporated in the present application by reference, as if actually set forth herein in full. The individual particles may be generally described as tripodal particles with generally uneven length legs and no uniformity in outline, the particles being broken and consisting of inter-connected strand portions from adjacent cells of the flexible foamed polyurethane. The strand portions are substantially free of intact cell windows and have hook-like projections showing identations and flutes. The uneven leg lengths and hook-like projections result from the destruction of the cell windows of the flexible polyurethane foam from which the micro-bits are produced.

The micro-bits of any styrene-polymer, lower polyolefin or polyurethane of the type described hereinabove may be prepared by disintegrating the respective starting expanded polymer bit pieces according to the process described in my aforesaid U.S. Pat. No. 4,207,378 (column 3, line 61 to column 4, line 21) using a comminuting machine such as the one therein described (column 4, line 22, to column 5, line 35.)

In addition to the cobeat of cellulose fibers and polymer micro-bits, the filter medium may be composed of one or more additional constituents including a wet web strengthening agent, a wet web support releasing agent, a wet strength enhancing agent, and an adsorbing agent selected from the group consisting of finely divided activated carbon, diatomaceous earth, colloidal alumina monohydrate or ion exchange resin.

Since, as indicated above, the filter medium is made by a wet-lay procedure, the wet web or sheet must have sufficient strength to withstand manipulation during processing. The necessary wet web strength is provided by the incorporation of fibrous materials such as polyester fibers and rayon fibers into the filter medium.

The wet filter medium web has a tendency to stick to the support element on which it is formed, e.g. the wire of a Fourdrinier machine, particularly when it contains high loadings of particulate materials. It has been found that the addition of a small amount of polyvinyl alcohol fibers is surprisingly effective in alleviating this sticking problem. Other forms of polyvinyl alcohol, e.g. powder, may also be used.

The wet strength enhancing agent best suited for the filter medium of the present invention is a melamine-formaldehyde resin, and preferably an aqueous colloidal suspension of cationic melamine-formaldehyde prepared by the condensation of melamine and formaldehyde in an aqueous acid medium, as described in U.S. Pat. Nos. 2,345,543 and 2,559,220. The amount of the binding agent used should be sufficient to impart the desired wet strength to the finished filter medium, but not so much as to impair the function of the other constituents of the filter medium. The melamine-formaldehyde resin is believed to cross-link cellulose molecules within the cellulose fiber bundles, taking up hydrophilic sites in the molecules. This has the combined effect of holding the fiber bundles rigidly together and making them resistant to attack by water. Other wet strength enhancing agents, which are well known in the paper making art may also be employed.

The adsorbing agents are incorporated in the filter medium to remove various dissolved and suspended substances from the water being processed. For example, activated charcoal removes odor and taste; diatomaceous earth enhances the filtering of fine particulate and colloidal material present in the water, and to a certain extent, enhances the porosity of the filter medium; colloidal alumina monohydrate is effective in removing chromic acid and certain of its salts; and the ion exchange resin takes up dissolved ionic species from the water.

In general the amounts of the various filter medium constituents must be adequate for each to perform its aforementioned function. However, because the relative amount of one constituent of the filter medium affects the possible maximum and minimum amounts of each of the other constituents, and thus its function, it is difficult to give specific ranges for the various constituents which may be included in the filter medium. For example, the wet web strengthening agent should be kept below the amount at which it tends to form agglomerates with other constituents of the filter medium. Similarly, in the case of the particulate adsorbing agent, namely activated carbon, diatomaceous earth and ion exchange resin, the amount used should be less than that at which release of the particles from the filter medium will occur under normal operating conditions. Such release will tend to contribute to turbidity.

Generally speaking, the cellulose fibers may range from about 10% to about 98% of the weight of the finished filter medium. The micro-bits may make up about 2% to about 90% of the total weight of the finished filter medium. Of course, as additional constituents are incorporated in the filter medium, there will be a corresponding decrease in the relative amounts of cellulose fibers and micro-bits present therein. As for the remaining constituents, the following amounts may be used, which are based on the total weight of the finished filter medium unless otherwise indicated:

(i) wet web strengthening agent: 2% to 10%;
(ii) wet web support releasing agent: 0.2 to 4.0%;
(iii) melamine-formaldehyde wet strength enhancing agent: 0.3% to 3%, based on the weight of cellulose fiber;
(vi) adsorbing agent
   (a) activated carbon (particle size from 1 to 100 microns): Up to about 70%;
   (b) diatomaceous earth: Up to about 70%;
   (c) colloidal alumina monohydrateL From about 1 to about 25%; or
   (d) ion exchange resin: Up to about 70%.

By reason of its unique combination of constituents and their arrangement therein, the filter medium in accordance with the present invention is capable of removing from a liquid stream colloids and other types of dispersed substances even when present at parts per billion (ppb) levels. The effective porosity of the mat is such as to retain finely divided particles of a size as low as 0.5 microns, while at the same time providing excellent filtrate flow rates.

The filter medium is prepared by forming an aqueous dispersion of the desired constituents and converting it to web or sheet form by one of the common processes used in the production of paper. Such processes ordinarily involve thorough homogenization of the dispersion in a mixing chest to insure uniformity, application of the homogenized dispersion to a porous substrate (usually an endless belt) to form a web or sheet, removal of the wet web or sheet from the porous substrate and drying of the web or sheet. The procedure for making the filter medium may be carried out conveniently on a Fourdrinier machine or similar apparatus used in paper making. Individual sheets may be made on a hand sheet mold by following essentially the same procedure.

In general, webs or sheets made by this procedure have wet tensile stength as high as 3.0 kg/cm. For example, a 40 mil thick sheet prepared by this process, and fully wetted and drained of free water, was found to have a tensile stength of 3.03 kg/cm., as measured by standard paper tensile tester.

The thickness of the web or sheet may be varied according to the nature of the impurities in the water to be treated, but is usually within the range of from 15 mil to 50 mil.

The following 2 examples will further serve to illustrate the procedure for making the filter medium.

EXAMPLE 1—COBEAT PREPARATION 318 kg. (dry basis) of cellulose (from 632 kg. wet lap cotton rag fibers of 50% moisture) and 150 kg. (dry basis) of polystyrene micro-bits (prepared as described in Example 1 of my U.S. Pat. No. 4,207,378) were charged into 11,455 liters of water in a pulper and agitated by its defibering rotor for 10 minutes to provide a uniform dispersion. The dispersion was transferred to a beater and subjected to beating action for 4 hours, attaining a freeness of 425.

190 liters of the cellulose/micro-bits dispersion were uniformly mixed in 22,710 liters of water in a beater chest and 32 kg. of TREVIRA ® polyethylene terephthalate polyester fibers were admixed therewith. The resulting slurry together with the remainder of the dispersion from the beater was pumped to the machine chest and then to the head box of a Fourdrinier machine, from where it flowed out through the slice and onto the moving Fourdrinier wire.

The resultant web was passed over two dryer cans heated to 116° C. and then through an Overly dryer (10 feet long) at 205° C. at a speed of 16.3 meters per minute. The dry cobeat was collected for use in preparation of the furnish for the filter medium.

EXAMPLE 2—FILTER MEDIUM

A first pulper charge was prepared from the cobeat of Example 1, containing about 14 kg. of cellulose, about 7 kg. of polystyrene micro-bits and about 1.7 kg. of TREVIRA ® polyester fiber, together with an additional 27.3 kg. of TREVIRA ® fiber and 15,152 liters of water. The charge was mixed in the pulper for two minutes and transferred to the beater chest.

A second pulper charge was prepared from the cobeat of Example 1, containing 121.8 kg. of cellulose, about 60.0 kg. of polystyrene micro-bits and about 13.7 kg. of TREVIRA ® fiber together with an additional 42.3 kg. of polystyrene micro-bits, 295.5 kg. of finely divided activated carbon (Westvaco's AQUA-NUCHAR) and 15,152 liters of water. This second charge was mixed for 10 minutes in the pulper and it too was transferred to the beater chest.

A third pulper charge containing 3788 liters of water and 113.6 liters of melamine-formaldehyde of the preferred type described above was mixed in the pulper for 30 seconds and transferred to the beater chest.

Five minutes after the addition of the melamine-formaldehyde to the beater chest, 2.3 kg. of polyvinyl alcohol fibers was added to the beater chest.

The slurry from the beater chest was pumped to the machine chest and then to the head box of a Fourdrenier machine, from where it flowed out through the slice and onto the moving Fourdrenier wire.

The resultant web was dewatered and dried in standard fashion using drum driers at about 127° C.

The following example describes the preparation of the pre-filter.

EXAMPLE 3—THE PRE-FILTER

A change of 10 kilograms of the cobeat of Example 1, 11.4 kilograms (dry basis) of polystyrene micro-bits (prepared as described in Example 1 of my U.S. Pat. No. 4,207,378), 6.4 kilograms of polyvinyl alcohol (98% hydrolyzed) powder, 3.8 liters of technical grade concentrated sulfuric acid (98.6%) and 9.1 kilograms of sodium hexametaphosphate was placed in a paper making pulper (E. D. Jones, Pitsfield, Mass., No. 3HI-LOW) containing 13,250 liters of water. The pulper was equipped with a defibering and circulating rotor operating at 800 r.p.m. which took approximately three minutes to disperse the solid components of the charge as a homogenous slurry in a clump-free state.

The rotor was turned off and 45.4 kg. each of 1.27 cm. long type K glass fibers, 12 microns in diameter, and 49.53 mm. long type DE fibers, 6 microns in diameter, were added to the slurry and mixing was resumed for about 15 minutes. The resulting glass fiber-containing dispersion was transferred to a paper making beater chest. Also added to the beater chest was a melamine-formaldehyde resin dispersion which was prepared by adding 91 liters of an aqueous colloidal solution of cationic melamine-formaldehyde resin containing 6% solids to 1890 liters of water in a paper-making pulper with stirring. The pulper was emptied and thereafter washed with 1890 liters of water and the wash water also was added to the beater chest.

The contents of the beater chest, in the form of a homogeneous dispersion containing 0.6% solids was transferred to a paper-making machine chest which is used to hold stock to be fed to the headbox from which the furnish is fed onto the Fourdrinier wire.

In going from the machine chest to the head box, the slurry was passed through a stock pump and any needed dilution water was introduced into the slurry at the stock pump suction point, the dilution water supply being controlled by an in-line consistency sensor. The slurry was passed under the head box slice bar, and was distributed (at a consistency of 0.05% solids and pH of about 3.5) in uniform spread and flow over the traveling Fourdrinier wire.

In addition to drainage through the screen, water was removed from the slurry as the screen passed over 5 Rice-Barton friction boxes operated at 7.62 cm. Hg. The newly formed web produced from the slurry (at about 50% dryness) continued at the same speed onto an endless belt conveyor and after about 1.5 meters beyond the end of the screen passed about 10 cm. below a battery (about 60.5 cm. long) of infra-red lamps (52.4 kilowatts, at 3.8 amperes, 480 volts, single phase 60 cycle a.c.) providing a temperature of approximately 650° C. at the web surface. The exposure of the wet web to that temperature for about 2.5 seconds quickly caused solution of the polyvinyl alcohol.

The partially dry web was passed through a tunnel dryer (about 3.67 meters long by 1.83 meters wide) at a temperature of about 121° C. and then alternated in sequence over and then under a series of six dryer drums (each drum in the series being at a slightly higher temperature than the preceeding one, the range being 113° C. to 127° C.), and on through an Overly dryer maintained at a drying temperature of 177° C. The finished pre-filter web leaving the Overly dryer (at 99% dryness) was collected on a take up reel.

The basis weight of the final product was 15.1 kg. per 100 square meters and its porosity, as measured by a Gurley Penetrometer, ranged from about 77.65 to 82.2 cu. m./sq. m./min. at a ΔP of 2.54 cm. of water. The tensile strength of this mat in the direction of the web is 5.55 kg./cm. and crosswise of the web is 2.95 kg./cm. The wet strength of the product was measured to be 2.4 kg./cm.

The filter medium of Example 2 and the pre-filter of Example 3 are available from Crane & Co., Dalton, Mass. These materials may be cut to a given size or used in web or sheet form, depending on the particular filtration device used in carrying out the process.

For a further understanding of the present invention reference is made to the following description and accompanying drawing, in which.

Figures 1, 2, 3:
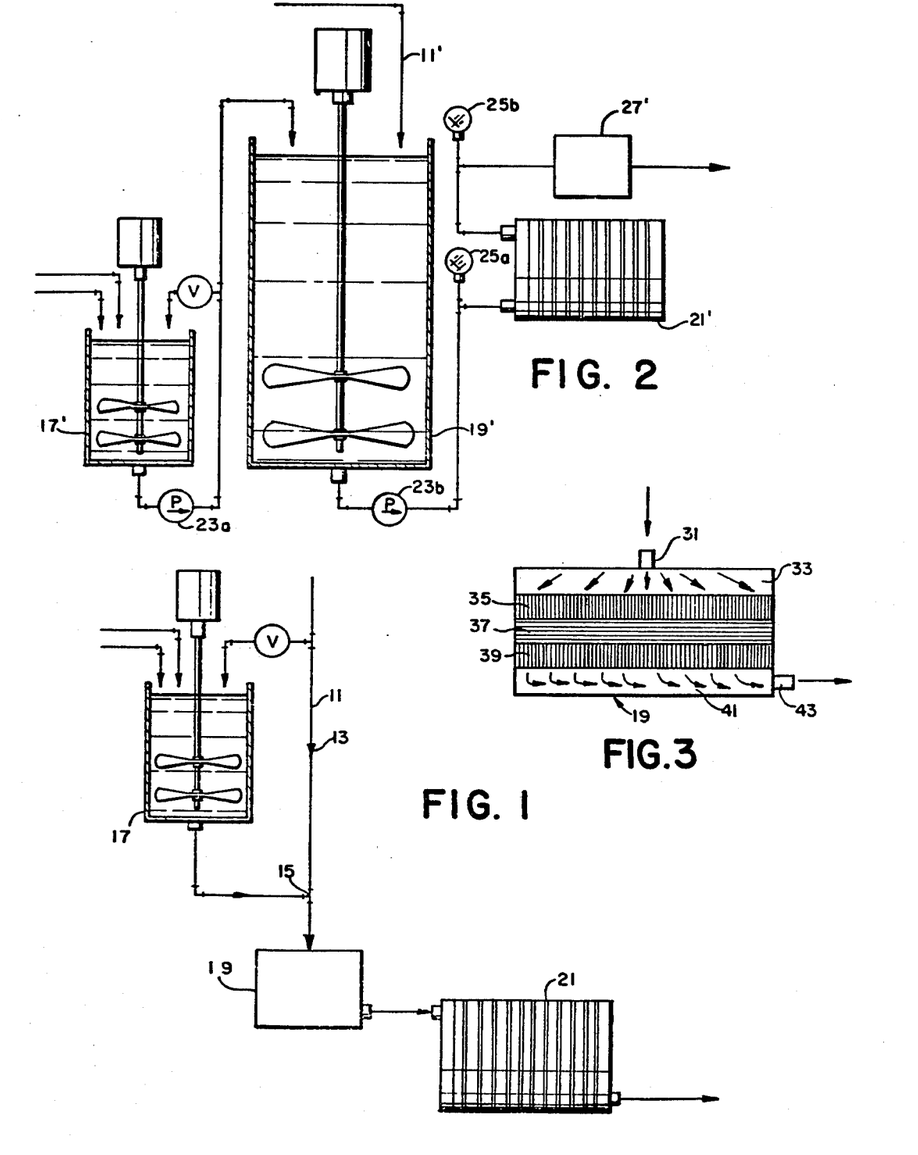
FIG. 1 is a schematic representation of a preferred system for carrying out the process of the present invention.
FIG. 2 is a schematic representation of an alternative system which may be used in carrying out the process of the present invention.
FIG. 3 is a schematic illustration of a cross-sectional view of a preferred mixing device for use in the system of FIG. 1 of the present invention.

In the system shown in FIG. 1, turbid water flows from a source (not shown) through conduit 11 having an open passageway, in the direction indicated by arrow 13. The conduit is provided with an inlet 15 for introduction of filter aid material into the impure water passing through the conduit. Metered amounts of filter aid material are delivered from mixing vessel 17, in which the filter aid material is mixed with water to form a slurry, to inlet 15 by a metering pump (not shown). Thorough mixing of the filter aid slurry and the turbid water is accomplished by mixing device 19.

As shown in FIG. 1, the mixing device 19 is preferably in line with the conduit. A preferred in-line mixing device is the Type SMV static mixer available from Koch Engineering Co., 4111 E. 37th St., North Wichita, Kans. 67220. The Type SMV mixer is composed of a succession of mixing elements, each element being in the form of a series of corrugated plates which are stacked to form open intersecting channels adapted to split liquid passing therethrough into separate streams, each successive element being turned 90° in relation to its adjacent element. A mixer of the type dismissed is illustrated in FIG. 3, water undergoing processing enters mixing device 19 through inlet 31 into inlet header 33. Thereafter the impure water and filter aid material are mixed by passing, first, through a series of vertically-arranged corrugated plates 35, then through a series of horizontally-arranged corrugated plates 37 and again through a series of vertically-arranged corrugated plates 39. The thoroughly mixed water and filter aid then passes through outlet header 41 and exits the mixing device through outlet 43. The size and number of the mixing elements may be varied to achieve the appropriate time of contact between the filter aid material and the impure water.

Water exiting from mixing device 19 of FIG. 1 passes through filter device 21, which houses the pre-filter along with one or more thicknesses of filter medium of the type described above. Satisfactory filtration has been achieved using a plate and frame filter press, the structure and operation of which are well known to those skilled in the art. However, the invention is not limited to the use of a filter press since virtually any filtration device that can accommodate the filter medium described herein may be used in the practice of the present invention. These include leaf-type filters, standard horizontal belt filters, filter belt presses, drum filters, and automatic, incremental-advance vacuum (or pressure), horizontal belt filters, such as the Miller Filter. When the filtrate flow rate reaches a point at which continued operation of the process would be inefficient, the flow of water is interrupted and the pre-filter and filter medium are replaced. The used materials may be readily disposed of, e.g., by incinertion.

As seen in FIG. 1, the filter device is preferably positioned lower than the raw water source so that the flow of water through the conduit is by gravitational force. One of the notable advantages of the present system is that the introduction of filter aid into the impure water and the mixing of the filter aid with the impure water are accomplished without interrupting the flow of water through the open passageway of the conduit. Accordingly, there is no appreciable loss of the gravity head. The filtration system illustrated in FIG. 1 is within the scope of the present invention.

The water treatment system illustrated in FIG. 2 differs from that illustrated in FIG. 1, in that a detention tank 19' has been substituted for the in-line mixing device 19 of FIG. 1. Also pump 23a is provided to deliver the filter aid slurry from mixing vessel 17' to detention tank 19', and pump 23b is provided to transfer the impure water containing the filter aid material from the detention tank to filtration device 21'. The inlet and outlet pipes of filter device 21' are also provided with pressure gauges 25a and 25b, respectively, to measure the pressure differential across the filter device. Flow meter 271 measures the filtrate flow rate.

The arrangement shown in FIG. 2 was used in carrying out the test described in the following example, the results of which clearly demonstrate the effectiveness of the water treatment process of the present invention.

The test was performed on raw water having an initial turbidity measurement between 1.3 and 1.7 TU as measured by a Hack nephelometric turbimeter. The water was taken from the Cleveland reservoir in Pittsfield, Mass. The test ran for about twenty-two hours, during which time 26,000 gallons of water were treated.

The filter medium used in carrying out the test was the carbon-loaded material described in Example 2. The pre-filter was the material of Example 3. The filter aid body feed was a composite comprising 99 parts diatomaceous earth (Johns-Mansville Celite 545) and 1 part polystyrene micro-bits (prepared as described in Example 1 of my U.S. Pat. No. 4,207,378).

The following apparatus was used in conducting the test (reference numerals correspond to FIG. 2):

The mixing vessel (17') was an 80 gal. vertical, open top, 304 stainless steel, flat bottom, cylindrical tank having a bottom center discharge. The detention tank (19') was a 500 gal. vertical, open top, 304 stainless steel, flat bottom, cylindrical tank vessel 17' and detention tank 19' were each equipped with a 2 horsepower Lightnin mixer having two six-inch propellers on the shaft. The filtration device (21') provided to deliver the filter aid slurry from mixing vessel 17' to detention tank 19', and pump 23b is provided to transfer the impure water containing the filter aid material from the detention tank to filtration device 21'. The inlet and outlet pipes of filter device 21' are also provided with pressure guages 25a and 25b, respectively, to measure the pressure differential across the filter device. Flow meter 27' measures the filtrate flow rate.

The arrangement shown in FIG. 2 was used in carrying out the test described in the following example, the results of which clearly demonstrate the effectiveness of the water treatment process of the present invention.

The test was performed on raw water having an initial turbidity measurement between 1.3 and 1.7 TU, as measured by a Hack nephelometric turbimeter. The water was taken from the Cleveland reservoir in Pittsfield, Mass. The test ran for about twenty-two hours, during which time 26,000 gallons of water were treated.

The filter medium used in carrying out the test was the carbon-loaded material described in Example 2. The pre-filter was the material of Example 3. The filter aid body feed was a composite comprising 99 parts diatomaceous earth (Johns-Mansville Celite 545) and 1 part polystyrene micro-bits (prepared as described in Example 1 of my U.S. Pat. No. 4,207,378).

The following apparatus was used in conducting the test (reference numerals correspond to FIG. 2):

The mixture vessel (17') was an 80 gal. vertical, open top, 304 stainless steel, flat bottom, cylindrical tank having a bottom center discharge. The detention tank (19') was a 500 gal. vertical, open top, 304 stainless steel, flat bottom, cylindrical tank having a side discharge near the bottom. The mixing vessel 17' and detention tank 19' were each equipped with a 2 horsepower Lightnin mixer having two six-inch propellers on the shaft. The filtration device (21') was a 12 inch diameter stainless steel plate and frame filter press having 16 sections. The filter aid slurry was transferred to the detention tank by a cam action displacement pump (23a). A return branch in the transfer line permitted flow rate regulation of the slurry to the detention tank. The water together with the filter aid was delivered from the detention tank to the filter press by a centrifugal pump (23b).

One Bourdon pressure gauge (25a), reading 0–60 psi, was placed at the inlet port of the filter press 21' and another (25b) was placed at the discharge port. The difference in the pressure gauge readings was taken as the $\Delta P$ across the pre-filter and filter medium. A cumulating flow meter measuring up to 10,000 gallons and then returning to point zero was used to measure the filtrate flow. Flow rate was determined by a stop watch.

The filter press 21' was prepared by first cleaning all the plate and frame surfaces with flush water. A twelve inch die cut disc of the filter medium of Example 2 was placed against the plates perforated walls. A pre-filter disc of the same size (also die cut), was placed against the filter medium. After sixteen pairs of the combined filter discs were set in place, the filter press was tightly closed by means of the screw jack.

The detention tank was filled to within a few inches of the top with raw water from the Cleveland reservoir. A weighed amount of 300 grams of diatomaceous earth and 3 grams of the polystyrene micro-bits was added to the water-filled detention tank with stirring at about 200 r.p.m. This dispersion was mixed for about seven hours before the run started.

The mixing vessel was filled to within a few inches of the top with water and a weighed amount of 200 grams of diatomaceous earth and 2 grams of polystyrene micro-bits was added. The contents of the mixing vessel were subjected to turbulent agitation throughout the entire test. A slurry flow rate of approximately one gallon per minute was maintained during the test. Approximately 60 gallons of raw water was added to the mixing vessel every hour. A weighed amount of 200 grams of diatomaceous earth and 2 grams of polystyrene micro-bits were added to the tank 19' at the same time. These additions were made every hour until the filtrate flow rate reached 20 gallons per minute. At that point, the rate of addition of the filter aid components was reduced to 100 grams of diatomaceous eather and 1 gram of micro-bits.

At the start of the run, the flow meter was adjusted to a zero reading, the inlet valve to the filter press 21' was opened and the centrifugal pump was started.

The raw water flow into the detention tank was set to maintain the water level in the tank to within a few inches of the top.

The progress of the test was monitored throughout, samples of the raw water, filter aid slurry water and filtrate were taken approximately at intervals of 3,000 gallons of through-put and the following data were recorded:

| Flow (gal.) | Flow rate (gal./min.) | Pressure Suction | Pressure Discharge | $\Delta P$ |
|---|---|---|---|---|
| — | — | 41 | 30 | 11 |
| 294 | 27.0 | 41 | 30 | 11 |
| 1,857 | 25.5 | 42 | 30 | 12 |
| 5,112 | 24.0 | 44 | 28 | 16 |
| 10,740 | 22.0 | 45 | 21 | 24 |
| 20,702 | 17.0 | 47 | 14.5 | 32.5 |
| 22,270 | 16.5 | 48 | 13 | 35 |
| 22,862 | 16.0 | 48 | 12.5 | 35.5 |
| 25,547 | 13.0 | 49 | 9 | 40 |
| 25,891 | 12.0 | 49 | 8.5 | 40.5 |

The turbidity of the filtrate was measured and found to range from about 0.3 TU to about 0.6 TU as measured by a Hack nephelometric turbimeter.

The weighted average flow rate during the test was approximately 22 gallons/min. Since the volume of the detention tank was 500 gallons, the average time of contact between water and diatomaceous earth was in the neighborhood of twenty (20) minutes. Of course, as the period of operation increases and the flow rate decreases, the contact time will become longer.

The pH of the filtrate did not change substantially during the test, the measurement being within the range of 6.2 to 6.7.

A second test was run using the pre-filter alone in the filter press and at 2,000 gallons of through-put, the turbidity level of the filtrate was found to be between 1.6 to 2.2 TU.

Other tests revealed that results comparable to those obtained with the composite filter aid described above are obtainable using the filter aid material alone. It has also been noted that an increase in the amount of micro-bits in the composite filter aid from 1% to 4% significantly reduces the through-put.

From the foregoing test, it can be seen that the present invention is capable of reducing turbidity to well within the established standard of 1 TU.

Although presently preferred embodiments of the invention have been described above, the practice of the invention may be modified. For example, additives other than the polymer micro-bits may be incorporated with the filter aid body feed in order to enhance the purity of the filtrate. For example, finely divided ion exchange resin may be employed for removing ionic species from the water. The finely divided ion-exchange resin may be obtained by subjecting commercially available products, such as Amberlite (Rohn and Hass Co.) or Dowex (The Dow Chemical Co.), to size reduction by grinding in a ball mill, for example. Although the synthetic polymer exchange resins are preferred, natural ion exchange resins, such as zeolites are also suitable for use herein.

Commercially available activated carbons are preferably used in the present invention. Suitable products include AQUA NUCHAR (used in Example 2 above), NUCHAR S-N or NUCHAR N-A (Westvaco), DARCO (I.C.I.-U.S.A.) Ltd., and NORIT (American Norit Co.). Activated carbon from pecan nut shells is also very effective. Activated carbons from various other sources, for example, charcoal, coal, petroleum distillation residue or other nut shells, may also be used.

The polystyrene micro-bits used in preparing the filter medium and pre-filter, as well as the separate micro-bits employed as an additive to the filter aid in the above examples, may be replaced by an equivalent amount of any of the other polymer micro-bits described herein.

If desired, the function of the polymer micro-bits and the ion exchange resin may be combined in a single particulate additive. This may be accomplished by appropriate modification of the micro-bits. For example, in order to prepare micro-bits having cation exchange capability, an aqueous slurry of the micro-bits is ozonated, and flushed with nitrogen. Thereafter, sodium vinyl sulfonate and reducing agents are added to the slurry at low temperature (on the order of 50° C.), whereby the sodium vinyl sulfonate is grafted to the available styrene surfaces. The grafted resin is acidified and unreacted sodium vinyl sulfonate is removed, e.g., by flushing with deionized water. The product is titrated with sodium hydroxide to provide approximately 5 meq./gm. dry resin.

A similar procedure may be followed to prepare micro-bits having anion exchange capability. Thus, metacrylamidopropyltrimethyl ammonium chloride may be grafted to the surface of the micro-bits using the procedure outlined above, with the product providing 3.5 meq./gm. of dry resin.

Other methods known to those skilled in the art may also be employed to incorporate ion exchange functionalities in the polymer micro-bits.

The cellulose fibers used in preparing the cobeat may be derived from sources other than cotton rag or linters, such as wood pulp of the type used in making writing paper. Furthermore, by virtue of the excellent drainage characteristics imparted to the web or sheet by the polymer micro-bits, cellulose fibers from sources which would ordinarily cause blinding of the porous substrate on which the web or sheet is formed, for example, newsprint, recycled Kraft paper, and the like, may also be used in preparing the cobeat. Also, while Example 1 discloses wet lap cotton fibers being incorporated in the cobeat, dry fibers also may be used when available or desired.

The polyester fibers which may be used as wet web strengthening agents, include, but are not limited to, those made from polyethylene terephthalate or dimethyl-1,4,-cyclohexane dimethanol terephthalate.

While various polyethylene terephthalate fibers may be used as the wet web strengthening agent, TREVIRA 101 ® (a product of American Hoechst Corporation) is preferred. TREVIRA 101 fibers are semi-dull, optically whitened fibers (available in 1.27 cm. lengths of 1.5 denier) spun by a conventional melt spinning process. They have a special finish compatible with most anionic, cationic or nonionic binders and give rapid and excellent dispersions with a wide variety of furnish systems and additives. TREVIRA 101 fibers (1.5 denier) have the following physical characteristics: solution viscosity: 770±20 when ½ gram is dissolved in 50 ml. of solvent which is by weight, 40 parts tetrachloroethane and 60 parts phenol at 25° C.; melting point: 494° F.; shrinkage, boiling water: 0%; and elongation-at-break: 45%. Additional information concerning TREVIRA polyester fibers may be found in U.S. Pat. Nos. 4,137,181 and 4,179,543.

It should be understood that the description of the invention set forth in the foregoing specification and examples is intended merely to illustrate and not to limit the invention. Moreover, it will be appreciated by those skilled in the art that the implementation of the different aspects of the above-described invention is capable of further variation and modification without departing from the spirit and scope of the invention as set forth in the appended claims.

I claim:

1. A water treatment process for removing turbidity-causing impurities from said water, said process comprising:
   a. adding to the impure water a minor amount of a filter aid material;
   b. contacting said impure water with said filter aid material for a time sufficient for impurities in said water to become absorbed on said filter aid material; and
   c. flowing said impure water containing said filter aid material having said impurities absorbed thereon through a pre-filter having a flow rate of at least two (2) liters/min./sq. m., and thereafter through a filter medium in the form of a porous, non-woven matrix made by a wet-lay procedure on a suitable support element and consisting essentially of the following constituents:
      (1) randomly arranged, irregularly intersecting and overlapping cellulose fibers in an amount sufficient to retain the integrity or continuity of the mat during said water treatment;
      (2) micro-bits produced from a polymer which is non-brittle in expanded form, and selected from (a) an expanded, thermoplastic styrene-polymer, (b) an expanded lower polyolefin, which is the polymer of a ethylenically unsaturated hydrocarbon monomer having from 2 to 6 carbon atoms, (c) an expanded melt alloy of polyethylene with up to about 10 percent by weight of polystyrene, (d) an expanded copolymer of propylene with from about 20 to about 30 percent by weight of ethylene, (e) an expanded melt alloy composed of at least 50 percent by weight of polypropylene and the balance being a copolymer of ethylene with up to about 30 percent of said copolymer being vinyl acetate, or micro-bits of a flexible foamed polyurethane, said polymer micro-bits being substantially completely free of intact cells of the expanded polymer from which they are produced, the amount of said micro-bits present in said filter medium being sufficient to provide the medium with a porosity enabling flow required for said water treatment, and at least one of the following:

(i) a wet web support releasing agent in an amount sufficient to facilitate removal of the filter medium from the support on which it is prepared;

(ii) a wet-strength enhancing agent in an amount sufficient to enhance the wet-strength of said filter medium, but less than that which will impair the functions of the constituents of said filter medium other than said wet-strength enhancing agent;

(iii) an adsorbing agent selected from the group consisting of (a') finely divided activated carbon in an amount below that at which substantial release of finely divided carbon from the filter medium can occur during said water treatment (b') diatomaceous earth in an amount below that at which substantial release of diatomaceous earth from the filter medium can occur during said water treatment; (c') colloidal alumnia monohydrate in an amount sufficient for removing a substantial portion of any chromic acid and its salts from said water undergoing treatment; and (d") a finely divided ion exchange resin in an amount sufficient to remove a substantial portion of ionized substances from said water undergoing treatment; and (iv) a wet web strengthening agent in an amount that together with the cellulose fibers is sufficient to provide the filter medium with a degree of tensile strength to withstand manpulation during its preparation, and below that amount at which said agent will agglomerate while being admixed with the aforementioned constituents of the filter medium.

2. The process claimed in claim 1 wherein the cellulose fibers and polymer micro-bits of the filter medium are in the form of a cobeat containing about one part of said polymer micro-bits and from about one to about two parts of said cellulose fibers.

3. The process claimed in claim 2 wherein the filter medium includes polyethylene terephthalate fibers as the wet web strengthening agent, polyvinyl alcohol as the wet web support releasing agent, melamine-formaldehyde resin as the wet-strength enhancing agent and finely divided activated carbon as the adsorbing agent.

4. The process claimed in claim 2 wherein the polymer micro-bits of the filter medium are polystyrene.

5. The process claimed in claim 2 wherein the polymer micro-bits of the filter medium are polyurethane.

6. The process claimed in claim 2 wherein the polymer micro-bits of the filter medium are polyethylene.

7. The process claimed in claim 1 wherein said impure water and said filter aid material are contacted for at least twenty (20) minutes.

8. The process claimed in claim 1 wherein the filter aid material is selected from the group consisting of diatomaceous earth, perlite, fuller's earth, vermiculite, volcanic ash, or fly ash.

9. The process claimed in claim 8 wherein the filter aid material is diatomaceous earth.

10. The process claimed in claim 1 wherein the prefilter is a non-woven matrix consisting essentially of, by weight:

(a) from 64.1% to about 83.5% of randomly arranged, irregularly intersecting and overlapping glass fibers composed of (i) about one inch long glass fibers that are about 12 microns in diameter, or (ii) about three-eighths inch long glass fibers that are about 6 microns in diameter, or mixtures thereof;

(b) from about 5.5% to about 12.8% of polymer micro-bits produced from a polymer selected from the group of (i) an expanded, thermoplastic styrene-polymer, (ii) an expanded lower polyolefin, which is the polymer of an ethylenically unsaturated hydrocarbon monomeric having from 2 to 6 carbon atoms, (iii) a copolymer of propylene with from about 20 to about 30 percent by weight of ethylene, (iv) a melt alloy of polyethylene with up to about 10 percent by weight of polystyrene, (v) a melt alloy composed of at least 50 percent by weight of polypropylene and the balance being a copolymer of ethylene with up to 30 percent (of the copolymer) being vinyl acetate, and (vi) a flexible foamed polyurethane, each said polymer being non-brittle in the form used to produce said micro-bits, (c) from about 2.8% to about 8.1% of polyvinyl alcohol, as a binder for the matrix;

(d) from about 6.6 to aout 9.5% of a cobeat composed of (i) one part of any said polymer micro-bits intermixed with (ii) from about one to about two parts of cellulose fibers, and (iii) non-shrinkable, non-slip polyester fibers in an amount from zero to about 7% of the sum of said (i) and (ii); and (e) from about 3.3% to about 5.5% of a melamine-formaldehyde resin as a wet-strength enhancing binder.

11. The process claimed in claim 1 wherein the filter aid material contains an additive selected from (i') polymer micro-bits produced from a polymer selected from the group of (a') a styrene-polymer, (b') a lower polyolefin, which is the polymer of an ethylenically unsaturated hydrocarbon monomer having from 2 to 6 carbon atoms, (c') a melt alloy of polyethylene with up to about 10 percent by weight of polystyrene, (d') a copolymer of propylene with from about 20 to about 30 percent by weight of ethylene, (e') a melt alloy composed of at least 50 percent by weight of polypropylene and the balance being a copolymer of ethylene with up to about 30 percent of said copolymer being vinyl acetate, and (f') a flexible foamed polyurethane, or mixtures thereof, each said polymer being non-brittle in the form used to produce said micro-bits; (ii') finely divided activated carbon; or (iii') finely divided ion exchange resin.

12. The process claimed in claim 11 wherein polystyrene micro-bits constitute the filter aid additive.

13. The process claimed in claim 11 wherein polyurethane micro-bits constitute the filter aid additive.

14. The process claimed in claim 11 wherein polyethylene micro-bits constitute the filter aid additive.

15. The process claimed in claims 1 or 10 wherein the steps of the process are carried out continuously.

16. The process claimed in claim 1, wherein the filter aid material is added to the impure water in an amount of no more than 0.1 percent by weight.

* * * * *